United States Patent [19]

Vijn et al.

[11] Patent Number: 5,588,488
[45] Date of Patent: Dec. 31, 1996

[54] CEMENTING MULTI-LATERAL WELLS

[75] Inventors: Jan P. Vijn, Leiderdorp; Zacharias Xenakis, Alkmaar, both of Netherlands; Daniel L. Bour; Jerry D. Childs, both of Duncan, Okla.

[73] Assignee: Halliburton Company, Duncan, Okla.

[21] Appl. No.: 518,082

[22] Filed: Aug. 22, 1995

[51] Int. Cl.$^6$ .............................. E21B 33/14; C04B 7/00
[52] U.S. Cl. ........................................ 166/293; 106/724
[58] Field of Search ................................. 166/293, 295, 166/294; 106/724, 725, 727

[56] References Cited

U.S. PATENT DOCUMENTS

| | | | |
|---|---|---|---|
| 3,228,907 | 1/1966 | Eash | 260/29.7 |
| 3,998,772 | 12/1976 | Beerbower et al. | 260/23.7 |
| 4,036,660 | 7/1977 | Persinski et al. | 106/90 |
| 4,151,150 | 4/1979 | Peters et al. | 260/29.7 |
| 4,537,918 | 8/1985 | Parcevaux et al. | 523/130 |
| 4,721,160 | 1/1988 | Parcevaux et al. | 166/293 |
| 4,746,365 | 5/1988 | Babcock et al. | 106/104 |
| 4,767,460 | 8/1988 | Parcevaux et al. | 106/90 |
| 4,849,018 | 7/1989 | Babcock et al. | 106/104 |
| 5,099,922 | 3/1992 | Ganguli | 166/293 |
| 5,135,577 | 8/1992 | Brothers | 106/724 |
| 5,159,980 | 11/1992 | Onan et al. | 166/294 |
| 5,293,938 | 3/1994 | Onan et al. | 166/293 |
| 5,389,706 | 2/1995 | Heathman et al. | 524/5 |

OTHER PUBLICATIONS

Larry Comeau, Randy Pustanvk and Ray Smith, Sperry–Sun Drilling Services, Nisku, Alberta, and Ian Gilles, Security DBS, Leduc, Alberta, "Lateral Tie–Back System Increases Reservoir Exposure" *World Oil*, Jul., 1995.

*Primary Examiner*—Frank Tsay
*Attorney, Agent, or Firm*—Craig W. Roddy

[57] ABSTRACT

The present invention provides methods of cementing the junction of multi-lateral wells whereby the set cement can withstand impacts and shocks without shattering. A cement slurry composition which sets into a high strength impact resistant solid mass is utilized comprised of a styrene/butadiene aqueous latex, a latex stabilizer, hydraulic cement and appropriate cementing additives.

20 Claims, No Drawings

CEMENTING MULTI-LATERAL WELLS

BACKGROUND OF THE INVENTION

1. Field of the Invention

The present invention relates generally to cementing multi-lateral wells, and more particularly, to methods of cementing such wells whereby the cement sets into a high strength impact resistant solid mass.

2. Description of the Prior Art

The development of wells including one or more laterals to increase production has recently taken place. Such multilateral wells include vertical or deviated (including horizontal) principal well bores having one or more ancillary laterally extending well bores connected thereto. More recently, drilling and completion equipment has been developed which allows multiple laterals to be drilled from a principal cased and cemented well bore. Each of the lateral well bores can include a liner cemented therein which is tied into the principal well bore. The lateral well bores of a multilateral well can be drilled into predetermined producing formations or zones at any time in the productive life cycle of the well, and the lateral-well bores also can be vertical or deviated (including horizontal).

While such multi-lateral wells have been successfully drilled and operated, a problem in the operation involves the cement slurry utilized to cement the casing and liners in the well. The casing and liners are cemented in the principal and lateral well bores, respectively, by introducing cement slurries in the annular clearances between the walls of the well bores and the casing and liners. The cement slurries set into hard masses to thereby support the casing and liners in the well bores and to seal the annuluses whereby fluid flow through the annuluses between formations and zones is prevented. Heretofore, conventional well cement slurries have been utilized which set into brittle solid masses. The brittle set cement can not withstand impacts and shocks subsequently generated by drilling and other well operations carried out in the multiple laterals without shattering. Once the set cement is shattered, it allows leakage of fluid through at least portions of the well bores which can be highly detrimental.

Thus, there is a need for improved methods of cementing multi-lateral wells whereby the set cement has a high strength and impact resistance and withstands shocks and impacts without shattering.

SUMMARY OF THE INVENTION

The present invention provides improved methods of cementing multi-lateral wells, particularly between the principal well bore and the laterals thereof, which meet the need described above and overcome the shortcomings of the prior art. The methods basically comprise the steps of introducing a cement slurry composition which sets into a high strength, impact resistant solid mass between the casing and liners of a multi-lateral well and the walls of the well bores thereof, and allowing the cement slurry composition to set therein.

The cement slurry composition is comprised of a styrene/butadiene aqueous latex, an effective amount of a latex stabilizing surfactant and hydraulic cement. Upon setting, the cement slurry composition forms a high strength impact resistant solid mass which can withstand higher impacts and will not shatter as a result of impacts and shocks subsequently generated in the well.

It is, therefore, a general object of the present invention to provide improved methods of cementing multilateral wells.

Other and further objects, features and advantages of the present invention will be readily apparent to those skilled in the art upon a reading of the description of preferred embodiments which follows.

Description of Preferred Embodiments

The high strength impact resistant cement slurry compositions which are useful for cementing multi-lateral subterranean wells in accordance with the present invention are basically comprised of a styrene/butadiene aqueous latex, an effective amount of a latex stabilizing surfactant and hydraulic cement.

The styrene/butadiene latex is an aqueous suspension of particles of styrene/butadiene copolymers. The latex suspension usually includes water in an amount in the range of from about 40% to about 70% by weight of the latex composition, and in addition to the suspended styrene/butadiene particles, the latex often includes small quantities of an emulsifier, polymerization catalysts, chain-modifying agents and the like. The weight ratio of styrene to butadiene in the latex can range from about 10%:90% to 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and has a carboxylate, sulfate or sulfonate group. Other groups that may be present on the third monomer include phosphates, phosphonates or phenolics. Non-ionic groups which exhibit stearic effects and which contain long ethoxylate or hydrocarbon tails also can be present.

A particularly suitable styrene/butadiene aqueous latex has a styrene/butadiene weight ratio of about 25%:75%, and the styrene/butadiene copolymer is suspended in a 50% by weight aqueous emulsion. This styrene/butadiene aqueous latex provides excellent impact resistance and fluid loss control to a set cement composition without loss of compressive strength in the set cement. A latex of this type is available, for example, from Unocal Chemicals Division of Unocal Corporation, Chicago, Ill., under the trade designation "LATEX 2000™."

The aqueous latex used is included in a cement slurry composition of this invention in an amount in the range of from about 35% to about 90% of the hydraulic cement in the composition.

In order to prevent the aqueous latex from prematurely coagulating and markedly increasing the viscosity of the cement slurry composition, one or more latex stabilizing surfactants are included in the composition. Latex stabilizers which are particularly suitable for use in accordance with the present invention are selected from the group consisting of surfactants having the formula

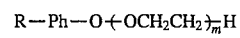

wherein R is an alkyl group having from 5 to 30 carbon atoms, Ph is phenylene and m is an integer in the range of from about 5 to about 50, and surfactants of the general formula

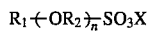

wherein $R_1$ is selected from the group consisting of $C_1$–$C_{30}$ alkyl groups, $C_5$–$C_6$ cycloalkyl groups, $C_1$–$C_4$ alkyl substituted $C_5$–$C_6$ cycloalkyl groups, a phenyl group, alkyl substituted phenyl groups of the general formula $(R_3)_a$Ph—where Ph is phenylene, $R_3$ is a $C_1$–$C_{18}$ alkyl group and a is an integer of from 1 to 3, and phenyl ($C_1$–$C_{18}$) alkyl groups having a total of from about 8 to about 28 carbon atoms, $R_2$ is a substituted ethylene group of the formula —$CH_2CHR_4$ wherein $R_4$ is selected from hydrogen, methyl, ethyl or mixtures thereof, n is an integer from 0 to about 40 provided that when $R_1$ is phenyl or alkyl substituted phenyl, n is at least 1 and X is any compatible cation. A preferred surfactant in this group is nonylphenyl ethoxylated with in the range of from about 20 to about 30 moles of ethylene oxide.

Another preferred surfactant in the group is a sodium salt having the general formula

wherein $R_5$ is an alkyl group having in the range of from about 1 to about 9 carbon atoms, $R_6$ is the group —$CH_2CH_2$—, o is an integer from about 10 to about 20 and X is a compatible cation.

Yet another preferred surfactant in the group is a sodium salt having the formula

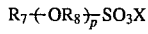

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant within this group has the formula

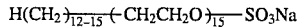

which is commercially available under the name "sodium $C_{12-15}$ pareth-15 sulfonate" from PPG Mazer, Mazer Chemicals, a Division of PPG Industries, Inc., 3938 Porett Drive, Gurnee, Ill. 60031.

The latex stabilizer utilized is included in the cement slurry composition in an amount in the range of from about 5% to about 30% by weight of the styrene/butadiene aqueous latex therein.

A variety of hydraulic cements can be utilized in accordance with the present invention including those of calcium, aluminum, silicon, oxygen and/or sulfur which set and harden by reaction with water. The hydraulic cements which can be used include Portland cements, microfine cements, pozzolana cements, gypsum cements, high alumina content cements, silica cements and high alkalinity cements. Portland cements are generally preferred for use in accordance with the present invention with Portland cements of API Classes G and H being preferred. API Class G Portland cement is the most preferred. The hydraulic cement utilized is generally included in the cement slurry composition in an amount in the range of from about 111% to about 285% by weight of the styrene/butadiene aqueous latex therein.

While the water in the styrene/butadiene aqueous latex can be adequate for forming the slurry and hydrating the cement, additional water can be utilized as required. The water can be from any source provided that it does not contain an excess of compounds that adversely affect the stability of the cement slurry composition. For example, the water can contain various salts such as sodium, potassium and calcium chloride or the like. Generally, water is present in a cement slurry composition of this invention in an amount in the range of from about 25% to about 30% by weight of hydraulic cement therein.

The cement slurry compositions useful herein can include other additives which are well known to those skilled in the art including fluid loss control additives, set retarding additives, dispersing agents, defoaming additives, silica flour to prevent compressive strength retrogression, formation conditioning additives, expansion aids for causing the cement to expand upon setting, set accelerators, weighting agents, lightening agents and others.

Examples of fluid loss control additives are cellulose derivatives such as carboxymethylhydroxyethyl cellulose, hydroxyethyl cellulose, modified polysaccharides, polyacrylamides, guar gum derivatives, 2-acrylamido-2-methylpropane sulfonic acid copolymers, polyethyleneamine and the like.

Generally, set retarding additives are included when it is necessary to extend the time in which the cement slurry composition can be pumped so that it will not thicken or set prior to being placed at a desired location in the well being cemented. Examples of set retarders which can be used include lignosulfonates such as calcium and sodium lignosulfonate, organic acids such as tartaric acid and gluconic acid, and others. The proper amount of retarder required for particular conditions can be determined by conducting a "thickening time test" for the particular retarder and cement composition. Such tests are described in *API Specification For Materials and Testing for Well Cements*, API Spec. 10. Generally, thickening time is the elapsed time from when pumping begins until the cement composition reaches about 70 to 100 units of consistency.

A particularly preferred set retarder for use in accordance with the present invention is a copolymer or copolymer salt of 2-acrylamido-2-methylpropanesulfonic acid and acrylic acid. The copolymer comprises from about 40 to about 60 mole percent 2-acrylamido-2-methylpropanesulfonic acid with the balance comprising acrylic acid and preferably has an average molecular weight below about 5,000. This copolymer set retarder is preferably utilized in the composition when the bottom hole circulating temperature exceeds about 200° F. Surprisingly, the retarder has been found to both retard the setting of the cement at elevated formation temperatures and to stabilize the styrene/butadiene aqueous latex against agglomeration or inversion at the elevated temperature. The set retarder is generally added to the cement slurry composition in an amount of from about 0.05% to about 3% by weight of hydraulic cement in the composition.

Dispersing agents can be utilized to facilitate using lower quantities of water and to promote higher set cement strength. A particularly suitable dispersing agent for use with the cement slurry compositions of this invention is comprised of the condensation polymer product of an aliphatic ketone, an aliphatic aldehyde and a compound which introduces acid groups into the polymer. Such a dispersant is described in U.S. Pat. No. 4,557,763 issued to George et al. on Dec. 10, 1985 which is incorporated herein by reference.

Defoaming additives can be utilized in the cement slurry composition to reduce or substantially eliminate foaming upon formation of the cement slurry. The defoamer can comprise substantially any of the compounds known for such capabilities such as the silicon oil compounds. Defoaming additives are generally admixed with the cement slurry composition in an amount in the range of from about 0.02 to about 0.08 gallons per 94 pound sack of cement in the composition.

Silica may be included in the compositions in amounts up to about 30% by weight of hydraulic cement therein, more preferably, up to about 35% by weight of cement, when a slurry with improved strength at elevated temperatures is desired.

Weighting agents such as various oxides of iron, barite, titanium and manganese (manganese tetraoxide) may be present in amounts of from about 0 to about 70% by weight of dry cement.

Lightening agents such as pozzolana, fly ash, silica glass, fumed silica or ceramic microspheres may be utilized in amounts up to about 50% by weight of dry cement.

The cement compositions of the present invention may be utilized in formations having bottom hole circulating temperatures of from about 30° F. to in excess of about 450° F.

The compositions of the present invention may be prepared in accordance with any of the well known mixing techniques so long as the latex and surfactant are not directly admixed without prior dilution by other liquids present. In one preferred method, the water is introduced into the cement blender and the defoamer, if present, surfactant and latex are then sequentially added with suitable agitation to disperse the constituents. Any other liquid additives may then be admixed with the slurry. Thereafter, the cement and any other dry solids are added to the blender and agitated for a sufficient period to admix the constituents. The amount of each constituent of the cement composition utilized in forming the cement slurry will depend upon the temperature level to be experienced, rheological considerations and the other additives that are present.

In carrying out the methods of this invention for cementing multi-lateral subterranean wells whereby the set cement can withstand impacts and shocks subsequently generated by drilling and other well operations without shattering, a cement slurry composition of the type described above which sets into a high strength impact resistant solid mass is introduced into the well. The cement composition is placed between conduits, i.e., casing and liners, and the walls of the principal and lateral well bores. Generally, the cement slurry composition used is pumped downwardly through the conduits to be cemented and then upwardly into the annuluses between the conduits and the walls of the well bores. Once placed, the cement slurry composition is allowed to set into a hard impact resistant solid mass which bonds the conduits to the well bores and seals the annuluses.

As mentioned, once the cement slurry composition has set in the annuluses, shocks and impacts from subsequent drilling and completion operations carried out in the well do not cause the set cement to be shattered, In order to further illustrate the methods and cement slurry compositions of the present invention, the following examples are given.

EXAMPLE 1

Three different high impact resistant cement slurry compositions of this invention were prepared by mixing the various components in the amounts set forth in Table I below.

TABLE I

High Impact Resistant Cement Slurry Compositions

| Component (liquids) | Amount, parts by wt. (solids) or gal/sk[7] of dry cement | | |
|---|---|---|---|
| | Slurry No. 1 | Slurry No. 2 | Slurry No. 3 |
| Portland Class G Cement[1] (solid) | 100 | 100 | 100 |
| Expansive Aid[2] (solid) | 5 | 5 | 5 |
| Dispersant[3] (solid) | 1 | — | — |
| Bentonite Clay (solid) | — | — | — |
| Styrene/Butadiene Aqueous Latex[4] (liquid) | 5.60 | 7.0 | 9.0 |
| Latex Stabilizer[5] (liquid) | 0.56 | 0.7 | 0.9 |
| Defoaming Agent[6] (liquid) | 0.20 | 0.2 | 0.2 |
| Total Mix Liquid, gal/sk | 6.36 | 7.90 | 10.1 |
| Density, lb./gal. | 15.1 | 14.2 | 13.3 |
| Yield, ft³/sk | 1.36 | 1.56 | 1.86 |

[1]Dyckerhoff
[2]Magnesium oxide
[3]Condensation polymer product of ketone, aldehyde and sodium sulfite.
[4]"LATEX 2000 ™" (Unocal)
[5]Nonylphenol ethoxylated with 20–30 moles of ethylene oxide.
[6]Polydimethylsiloxane
[7]Gallon per 94 lb sack of dry cement.

Each of the slurries described in Table I were tested for slurry rheology, free water, thickening time at 140° F., compressive strength at 220° F., crush compressive strength at 220° F. and tensile strength at 220° F. The various tests were run in accordance with the procedure specified in *API Specification for Materials and Testing for Well Cements,* API Spec. 10, fifth edition dated Jul. 1, 1990. The results of these tests are set forth in Table II below.

TABLE II

Test Results

| | Test Results | | | | | |
|---|---|---|---|---|---|---|
| | Slurry No. 1 | | Slurry No. 2 | | Slurry No. 3 | |
| Rheology, cp | 80° F. | 140° F. | 80° F. | 140° F. | 80° F. | 140° F. |
| 600 rpm | 564 | 600+ | 310 | 320 | 190 | 148 |
| 300 rpm | 340 | 464 | 180 | 216 | 116 | 90 |
| 200 rpm | 256 | 340 | 134 | 152 | 86 | 66 |
| 100 rpm | 158 | 210 | 82 | 94 | 52 | 40 |
| 6 rpm | 26 | 36 | 12 | 16 | 8 | 8 |
| 3 rpm | 18 | 24 | 8 | 12 | 6 | 6 |
| Plastic Viscosity, cp | 273 | 380 | 147 | 183 | 96 | 75 |
| Yield Pt., lbs/100 ft.² | 74 | 90 | 36 | 34 | 22 | 16 |
| Free Water and Settling | | | | | | |
| Free Water @ 140° F. and 45° angle | 0 | | 0 | | 0 | |
| Settling @ 140° F. and 45° angle | 0 | | 0 | | 0 | |
| Thickening Time at 140° F., | 3:55 | | 4:08 | | 6:56 | |

TABLE II-continued

Test Results

| | Test Results | | |
|---|---|---|---|
| | Slurry No. 1 | Slurry No. 2 | Slurry No. 3 |
| hr:min Compressive Strength @ 220° F. | | | |
| Initial set, hr:min | 6:43 | 10:13[1] | 12:22 |
| 500 psi, hr:min | 24:36 | — | — |
| 24 hour strength, psi | 494 | 338 | 300 |
| Strength at time, psi @ hr:min | 652 @ 95:27 (1190[2]) | 482 @ 96:36 (890[2]) | 97 @ 96:10 (440[2]) |
| Crush Compressive Strength @ 220° F. 3-Day, psi | 1860 | 830 | 570 |
| Tensile Strength @ 220° F. 3-Day, psi | 279 | 201 | 97 |

[1]Used standard correlation (above 14 lb/gal).
[2]Crush strength, psi

EXAMPLE 2

A control cement slurry composition was prepared (Slurry No. 4) comprised of Portland Class G cement; water and a small amount of bentonite clay. The amounts of the components making up the slurry and the results of crush compressive strength and tensile strength tests are set forth in Table III below.

TABLE III

Slurry No. 4 (Control Cement Slurry Composition)

| Component | Amount, parts by wt. (solids) and gal/sk of dry cement (liquids) |
|---|---|
| Portland Class G Cement (solid) | 100 |
| Bentonite Clay (solid) | 0.25 |
| Water (liquid) | 5.0 |
| Density, lb/gal | 15.9 |
| Yield, ft.³/sk | 1.14 |
| Crush Compressive Strength 3-Day @ 220° F., psi | 2690 |
| Tensile Strength 3-Day @ 220° F., psi | 486 |

EXAMPLE 3

Three samples each of the slurries numbered 1–4 described above were tested for resistance to impact. The test procedure involved dropping a 2 kilogram weight from a 2.5 meter height onto a set cube of the cement slurry sample measuring 2"×2"×2". The number of times the weight had to be dropped on each cube in order for the cube to lose 50% of its weight was determined. The test evaluates the toughness, resilience and flexibility of the cement. The results of these tests are set forth in Tables IV–VII below.

TABLE IV

Impact Test Results For Slurry No. 1

| | Sample No. 1 | | Sample No. 2 | | Sample No. 3 | |
|---|---|---|---|---|---|---|
| Number of Impacts | Wt. Loss (%) | Comment | Wt. Loss (%) | Comment | Wt. Loss (%) | Comment |
| 1 | 0.2 | | — | | — | |
| 5 | 0.3 | Crack | — | | — | |
| 6 | 1.1 | | — | | — | |
| 7 | 1.2 | | — | | — | |
| 8 | 1.3 | | 0.1 | Crack | — | |
| 9 | 1.3 | | — | | — | |
| 10 | 1.4 | | — | | — | |
| 11 | 1.5 | | — | | — | |
| 12 | 1.8 | | — | | — | |
| 13 | 2.4 | | 0.2 | | — | |
| 14 | 2.8 | | 1.2 | | 0.4 | |
| 15 | 3.1 | Big Crack | — | | — | Crack |
| 16 | 3.3 | | — | | — | |
| 17 | 5.4 | | 1.2 | | 0.4 | |
| 18 | 5.9 | | 1.2 | | 0.5 | |
| 19 | 6.0 | | — | | 0.6 | Big Crack |
| 20 | 6.0 | | 1.2 | Cracking | 0.6 | |

TABLE V

Impact Test Results For Slurry No. 2

| | Sample No. 1 | | Sample No. 2 | | Sample No. 3 | |
|---|---|---|---|---|---|---|
| Number of Impacts | Wt. Loss (%) | Comment | Wt. Loss (%) | Comment | Wt. Loss (%) | Comment |
| 7 | — | | — | | 0.2 | Crack |
| 9 | — | | — | | — | |
| 10 | 0.3 | Crack | — | | 0.2 | Big Crack |
| 11 | — | | 0.2 | Crack | — | |
| 13 | — | | — | | 0.2 | Deformation |
| 14 | — | | — | | 10.3 | |
| 15 | — | Big Crack | 0.3 | | — | |
| 16 | — | | — | | 10.7 | |
| 17 | 3.3 | | 0.5 | | 10.7 | |
| 18 | 7.0 | | 19 | | 24.1 | |
| 19 | 27.0 | | 19.8 | | — | |
| 20 | >50 | Total Failure | >50 | Total Failure | >50 | Total Failure |

TABLE VI

Impact Test Results For Slurry No. 3

| | Sample No. 1 | | Sample No. 2 | | Sample No. 3 | |
|---|---|---|---|---|---|---|
| Number of Impacts | Wt. Loss (%) | Comment | Wt. Loss (%) | Comment | Wt. Loss (%) | Comment |
| 2 | — | | — | | — | Crack |
| 3 | — | Crack | — | Big Crack | — | |
| 4 | — | | — | | — | |
| 5 | — | | 1.4 | | 1.3 | |
| 6 | 0.2 | | >50 | Total Failure | 1.5 | |
| 7 | 11.1 | | — | | >50 | Total Failure |

TABLE VI-continued

Impact Test Results For Slurry No. 3

| Number of Impacts | Sample No. 1 | | Sample No. 2 | | Sample No. 3 | |
|---|---|---|---|---|---|---|
| | Wt. Loss (%) | Comment | Wt. Loss (%) | Comment | Wt. Loss (%) | Comment |
| 8 | >50 | Total Failure | — | | — | |

TABLE VII

Impact Test Results For Slurry No. 4 (Control)

| Number of Impacts | Sample No. 1 | | Sample No. 2 | | Sample No. 3 | |
|---|---|---|---|---|---|---|
| | Wt. Loss (%) | Comment | Wt. Loss (%) | Comment | Wt. Loss (%) | Comment |
| 1 | >50 | Total Failure | >50 | Total Failure | >50 | Total Failure |

From the test results set forth in Tables IV–VII above, it can be seen that the high impact resistant cement slurry compositions useful in accordance with this invention can withstand 20 impacts or more before total destruction while the control cement slurry (Slurry No. 4) totally shattered and failed in one impact.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of cementing conduits in a multi-lateral subterranean well whereby the set cement can withstand impacts and shocks subsequently generated by drilling and other well operations without shattering, comprising the steps of:

(a) introducing a cement slurry composition which sets into a high strength impact resistant solid mass between said conduits and the walls of said well, said cement slurry composition comprising
a styrene/butadiene aqueous latex,
an effective amount of a latex stabilizer selected from the group consisting of surfactants having the formula $$R-Ph-O+OCH_2CH_2)_{\overline{m}}H$$

wherein R is an alkyl group having from 5 to 30 carbon atoms, Ph is phenylene and m is an integer in the range of from about 5 to about 50, and surfactants of the general formula

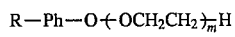

wherein $R_1$ is selected from table group consisting of $C_1$–$C_{30}$ alkyl groups, $C_5$–$C_6$ cycloalkyl groups, $C_1$–$C_4$ alkyl substituted $C_5$–$C_6$ cycloalkyl groups, phenyl, alkyl substituted phenyl of the general formula $(R_3)_a$ Ph—where Ph is phenylene, $R_3$ is a $C_1$–$C_{18}$ alkyl group and a is an integer of from 1 to 3, and phenyl ($C_1$–$C_{18}$) alkyl groups having a total of from about 8 to about 28 carbon atoms, $R_2$ is a substituted ethylene group of the formula —$CH_2CH$ $R_4$ wherein $R_4$ is selected from hydrogen, methyl, ethyl or mixtures thereof, and n is a number from 0 to about 40 provided that when $R_1$ is phenyl or alkyl substituted phenyl, n is at least 1 and X is any compatible cation, and
hydraulic cement; and (b) allowing said cement slurry composition to set in said well.

2. The method of claim 1 wherein said styrene/butadiene aqueous latex contains water in an amount in the range of from about 40% to about 70% by weight of said latex, and the weight ratio of styrene to butadiene in said latex is in the range of from about 10%:90% to about 90%:10%.

3. The method of claim 1 wherein said styrene/butadiene aqueous latex is present in said cement slurry composition in an amount in the range of from about 35% to about 90% by weight of hydraulic cement in said composition.

4. The method of claim 1 wherein said latex stabilizer is selected from the group consisting of surfactants of the general formula

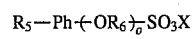

wherein $R_5$ is an alkyl group having in the range of from about 1 to about 9 carbon atoms, $R_6$ is the group —$CH_2CH_2$—, o is an integer from about 10 to about 20 and X is a compatible cation.

5. The method of claim 1 wherein said latex stabilizer is selected from the group consisting of surfactants of the general formula

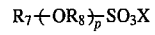

wherein $R_7$ is an alkyl group having in the range of from about 5 to about 20 carbon atoms, $R_8$ is the group —$CH_2CH_2$—, p is an integer in the range of from about 10 to about 40 and X is a compatible cation.

6. The method of claim 1 wherein said latex stabilizer is selected from the group consisting of nonylphenol ethoxylated with in the range of from about 20 to about 30 moles of ethyleneoxide and sodium $C_{12-15}$ pareth-15 sulfonate.

7. The method of claim 2 wherein said latex stabilizer is present in said cement slurry composition in an amount in the range of from about 5% to about 30% by weight of said styrene/butadiene aqueous latex therein.

8. The method of claim 1 wherein said hydraulic cement is present in said cement slurry composition in an amount in the range of from about 111% to about 285% by weight of said styrene/butadiene aqueous latex therein.

9. The method of claim 1 wherein said hydraulic cement is Portland Class G cement.

10. The method of claim 1 wherein water is present in said cement slurry composition in an amount in the range of from about 25% to about 30% by weight of cement therein.

11. The method of claim 1 wherein said cement slurry composition further includes a dispersant comprised of the condensation polymer product of an aliphatic ketone, an aliphatic aldehyde and a compound which introduces acid groups into the polymer.

12. The method of claim 1 wherein said cement slurry composition further includes a set retarder comprised of a copolymer or copolymer salt of 2-acrylamido-2-methylpropanesulfonic acid and acrylic acid in a mole ratio in the range of from about 40 to about 60 mole percent 2-acrylamido-2-methylpropanesulfonic acid with the balance comprising acrylic acid, and said copolymer or copolymer salt having a molecular weight below about 5000.

13. A method of cementing casing and liners in a multilateral subterranean well whereby the set cement can withstand the impacts and shocks subsequently generated by drilling and other well operations without shattering comprising the steps of:

(a) introducing a cement slurry composition which sets into a high strength impact resistant solid mass between said casing and liners and the walls of said well, said cement slurry composition comprising a styrene/butadiene aqueous latex containing water in an amount of about 50% by weight of said latex and the weight ratio of styrene to butadiene in said latex being in the range of from about 10%:90% to about 90%:10%, a latex stabilizer selected from the group consisting of surfactants having the formula $$R-Ph-O(-OCH_2CH_2)_m H$$

wherein R is an alkyl group having from 5 to 30 carbon atoms, Ph is phenylene and m is an integer in the range of from about 5 to about 50, and surfactants of the general formula $$R_1(-OR_2)_n SO_3X$$

wherein $R_1$ is selected from the group consisting of $C_1-C_{30}$ alkyl groups, $C_5-C_6$ cycloalkyl groups, $C_1-C_4$ alkyl substituted $C_5-C_6$ cycloalkyl groups, phenyl, alkyl substituted phenyl of the general formula $(R_3)_a$ Ph—where Ph is phenylene, $R_3$ is a $C_1-C_{18}$ alkyl group and a is an integer of from 1 to 3, and phenyl $(C_1-C_{18})$ alkyl groups having a total of from about 8 to about 28 carbon atoms, $R_2$ is a substituted ethylene group of the formula —$CH_2CH$ $R_4$ wherein $R_4$ is selected from hydrogen, methyl, ethyl or mixtures thereof, and n is a number from 0 to about 40 provided that when $R_1$ is phenyl or alkyl substituted phenyl, n is at least 1 and X is any compatible cation, and hydraulic cement present in said composition in an amount in the range of from about 111% to about 285% by weight of said styrene/butadiene aqueous latex; and (b) allowing said cement slurry composition to set in said well.

14. The method of claim 13 wherein said latex stabilizer is selected from the group consisting of surfactants of the general formula $$R_5-Ph(-OR_6)_o SO_3X$$

wherein $R_5$ is an alkyl group having in the range of from about 1 to about 9 carbon atoms, $R_6$ is the group —$CH_2CH_2$—, o is an integer from about 10 to about 20 and X is a compatible cation.

15. The method of claim 13 wherein said latex stabilizer is selected from the group consisting of surfactants of the general formula:

$$R_7(-OR_8)_p SO_3X$$

wherein $R_7$ is an alkyl group having in the range of from about 5 to about 20 carbon atoms, $R_8$ is the group —$CH_2CH_2$—, p is an integer in the range of from about 10 to about 40 and X is a compatible cation.

16. The method of claim 13 wherein said latex stabilizer is selected from the group consisting of nonylphenol ethoxylated with in the range of from about 20 to about 30 moles of ethyleneoxide and sodium $C_{12-15}$ pareth-15 sulfonate.

17. The method of claim 13 wherein said cement slurry composition further includes a dispersant comprised of the condensation polymer product of an aliphatic ketone, an aliphatic aldehyde and a compound which introduces acid groups into the polymer.

18. The method of claim 13 where, in said cement slurry composition further includes a set retarder comprised of a copolymer or copolymer salt of 2-acrylamido-2-methylpropanesulfonic acid and acrylic acid in a mole ratio in the range of from about 40 to about 60 mole percent 2-acrylamido-2-methylpropanesulfonic acid with the balance comprising acrylic acid and said copolymer or copolymer salt having a molecular weight below about 5000.

19. A method of cementing casing and liners in a multilateral subterranean well whereby the set cement can withstand the impacts and shocks subsequently generated by drilling and other well operations without shattering comprising the steps of:

(a) introducing a cement slurry composition which sets into a high strength impact resistant solid mass between said casing and liners and the walls of said well, said cement slurry composition comprising a styrene/butadiene aqueous latex containing water in an amount of about 50% by weight of said latex and the weight ratio of styrene to butadiene in said latex being about 25%:75%, a latex stabilizer selected from the group consisting of nonylphenol ethoxylated with in the range of from about 20 to about 30 moles of ethylene oxide and sodium $C_{12-15}$ pareth-15 sulfonate present in said composition in an amount in the range of from about 5% to about 30% by weight of said styrene/butadiene aqueous latex, and Portland Class G hydraulic cement present in said composition in an amount in the range of from about 111% to about 285% by weight of said styrene/butadiene aqueous latex; and (b) allowing said cement slurry composition to set in said well.

20. The method of claim 19 wherein water is present in said cement slurry composition in an amount in the range of from about 25% to about 30% by weight of hydraulic cement therein.

* * * * *